(12) United States Patent
Rollinger et al.

(10) Patent No.: US 7,353,699 B2
(45) Date of Patent: Apr. 8, 2008

(54) ELECTRONIC THROTTLE CONTROL SUPERCHARGING

(75) Inventors: John Rollinger, Sterling Heights, MI (US); Karen Willard, Grosse Pointe Farms, MI (US); Paul Pietrzyk, Beverly Hills, MI (US); Michael J. Cullen, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 182 days.

(21) Appl. No.: 11/298,221

(22) Filed: Dec. 8, 2005

(65) Prior Publication Data

US 2007/0130945 A1   Jun. 14, 2007

(51) Int. Cl.
*G01M 15/00* (2006.01)

(52) U.S. Cl. .................... 73/118.1; 73/118.2
(58) Field of Classification Search ............ 73/112, 73/115, 116, 117.2, 117.3, 118.1, 118.2, 119 R
See application file for complete search history.

(56) References Cited

U.S. PATENT DOCUMENTS

| | | | | |
|---|---|---|---|---|
| 5,090,202 A | * | 2/1992 | Hitomi et al. | 606/2 |
| 5,191,789 A | * | 3/1993 | Furuya | 73/118.2 |
| 5,546,795 A | * | 8/1996 | Yamagishi | 73/118.2 |
| 5,900,540 A | * | 5/1999 | Wenzlawski et al. | 73/115 |
| 6,694,734 B2 | * | 2/2004 | Akao et al. | 60/605.1 |
| 2007/0131206 A1 | * | 6/2007 | Rollinger et al. | 123/559.1 |

OTHER PUBLICATIONS http://www.pontiac.com/grandpix/specs_viewall.jsp   Mar. 30, 2005; 10 pages.

* cited by examiner

*Primary Examiner*—Eric S. McCall
(74) *Attorney, Agent, or Firm*—Allan J. Lippa; Alleman Hall McCoy Russell & Tuttle LLP

(57) ABSTRACT

A drive system. The drive system includes an engine configured to convert chemical energy into mechanical energy, an electronically-controlled air throttle configured to regulate air delivery to the engine, a supercharger configured to selectively increase pressure of the air delivered to the engine, and a supercharger diagnostic system configured to diagnose supercharger over-boosting or under-boosting.

15 Claims, 5 Drawing Sheets

ELECTRONIC THROTTLE CONTROL SUPERCHARGING

BACKGROUND AND SUMMARY

The present disclosure is directed toward a supercharged engine that uses electronic throttle control.

A supercharger (also known as a blower, a positive displacement pump, or a centrifugal pumper) can be used to increase the effective displacement of an engine by forcing a relatively high volume of air into the cylinders for combustion. The additional mass of oxygen that is forced into the cylinders allows the engine to burn more fuel, which improves the volumetric efficiency of the engine and makes it more powerful. A supercharger can be mechanically powered from the engine's crankshaft or from another power source, such as an electric battery.

Electronic throttle control (ETC) can be used to control air throttle without directly mechanically linking the accelerator pedal to the air throttle. This can be accomplished by using a throttle position sensor to feed throttle-position data to a computer. The computer can process the data to decide a desired throttle position, which can be controlled with a solenoid or similar mechanism.

The inventors herein have recognized that several challenges exist in designing an engine that uses a supercharger and ETC. In a pedal-follower based ETC system, in which throttle angle can be monitored, a supercharger affects air-fuel control. Furthermore, the addition of torque based control of throttle position substantially increases the challenges of accurately monitoring and delivering airflow. Potential supercharger DEGRADATION including over-boosting or under-boosting further increase the challenges of operating a supercharger in a drive system that includes electronic throttle control.

At least some of the issues associated with a supercharged ETC engine may be addressed by a drive system including an engine configured to convert chemical energy into mechanical energy, an electronically-controlled air throttle configured to regulate air delivery to the engine, a supercharger configured to selectively increase pressure of the air delivered to the engine, and a supercharger diagnostic system configured to diagnose supercharger over-boosting or under-boosting.

WRITTEN DESCRIPTION

Figure 1:
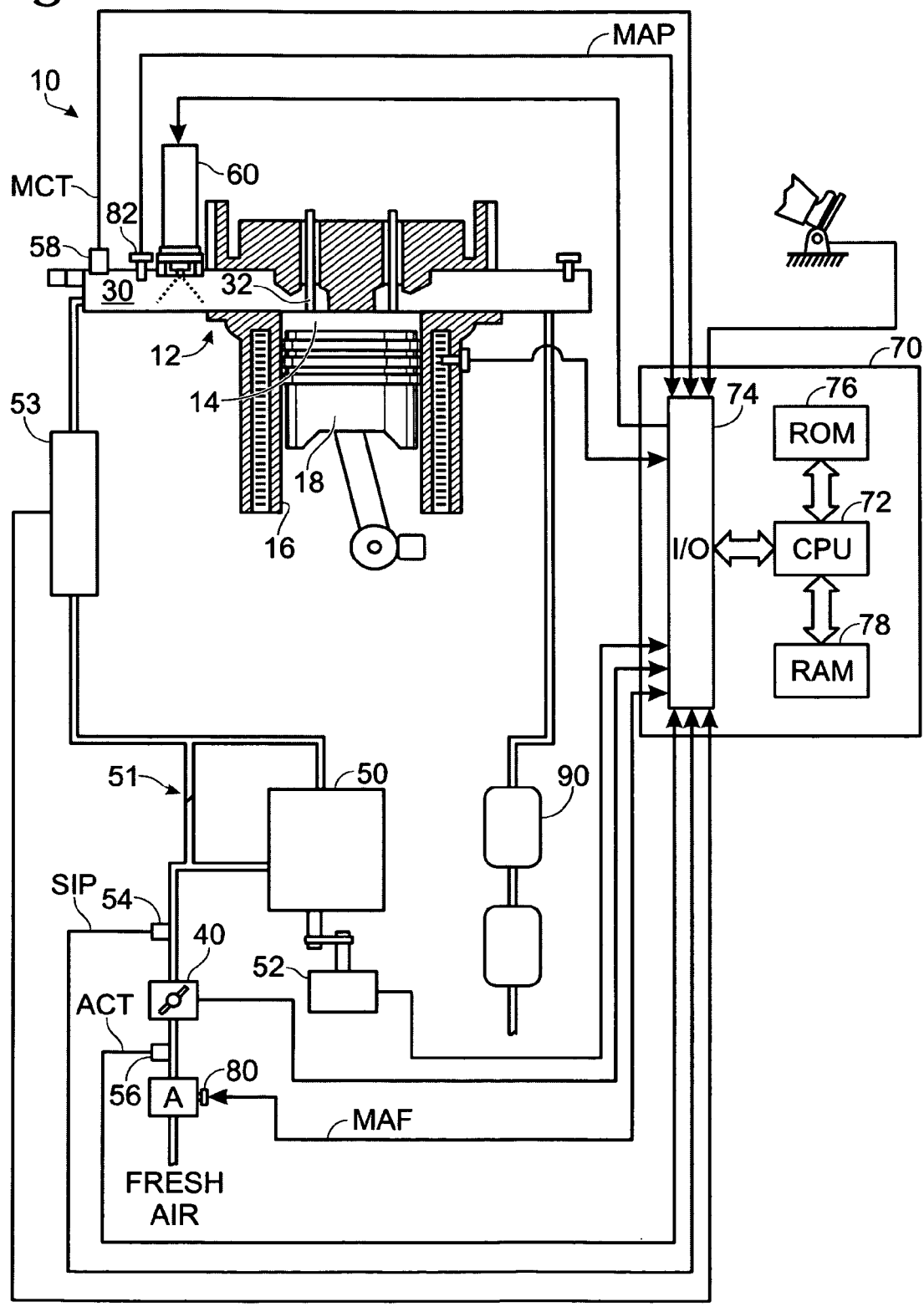
FIG. 1 schematically shows a drive system including a supercharger and electronic throttle control.

FIG. 1 schematically shows an internal combustion engine 10 that is configured to convert fuel into mechanical energy. Engine 10 may include one or more cylinders, one of which is illustrated at 12. Cylinder 12 includes a combustion chamber 14 at least partially defined by cylinder walls 16 and a moveable piston 18.

Combustion chamber 14 is in fluid communication with an air intake manifold 30 via intake valve 32. The air intake manifold can be used to deliver air, including oxygen ($O_2$), to the combustion chamber for combustion. The intake valve can be controlled so that a desired flow of air enters the combustion chamber at a desired time, while at the same time preventing undesired backflow.

An electronically controlled throttle 40 can be used to control airflow through the air intake manifold. The rate of airflow through an internal combustion engine can influence the amount of power the engine generates. Restricting the input flow can reduce the pressure in the intake manifold, thus reducing engine power. When the throttle is opened all the way in a "normally aspirated" engine, the engine's air induction system is exposed to full atmospheric pressure, and maximum airflow through the engine is achieved. In a normally aspirated engine, total engine output is thus determined by the ambient barometric pressure.

A supercharger 50 can increase the manifold pressure above the local ambient pressure, thus increasing the relative mass of $O_2$ available for combustion, and thus the power output of the engine. In some embodiments, supercharger 50 can be vacuum operated and in some embodiments it can be electronically controlled. The supercharger can include a bypass valve 51, such as a vacuum based bypass valve or a computer controlled bypass valve. A variable engagement mechanism 52 (e.g. electronically controlled clutch) can be used to selectively activate and deactivate the supercharger and/or to control a relative amount of supercharger engagement. A pressure sensor 54 can measure the pressure upstream of the supercharger (SIP). In some embodiments, a manifold pressure MAP downstream of the supercharger can be measured by a sensor 82. In some embodiments, the MAP can be inferred from other parameters. A temperature sensor 56 may be present for measuring the temperature ACT in the intake system upstream of the supercharger and/or a temperature sensor 58 may be present for measuring the temperature MCT downstream of the supercharger. In some embodiments, alternative and/or additional sensors may be used to monitor pressures, temperatures, and/or other engine conditions. In some embodiments, an intercooler 53 may be used to cool air charged (compressed) by the supercharger.

Engine 10 can include a mechanism for delivering fuel to the combustion chamber. In the illustrated embodiment, engine 10 includes an electronically-controlled fuel injector 60 positioned for delivering fuel to the combustion chamber via the intake manifold. A particular cylinder can include additional or alternative mechanisms for delivering fuel to the combustion chamber. In some embodiments, one or more fuel injectors can be positioned to deliver fuel directly to the combustion chamber, and in some embodiments, one or more fuel injectors can be positioned to deliver fuel to an intake manifold or to another location. Furthermore, in some embodiments, a mechanism other than an electronically controlled fuel injector can be used to deliver fuel to the combustion chamber. When a fuel injector is used, it can be configured to receive a pulse-width-modulated signal, which can control the ejection of fuel from the fuel injector.

Engine 10 can also include one or more exhaust gas treatment devices configured to limit undesired tailpipe emissions. For example, engine 10 can include a $NO_x$ trap 90 configured to absorb feedgas $NO_x$. As illustrated, the $NO_x$ trap is downstream of booster 50. In some embodiments, the NOx trap can be upstream of booster 50. Additional or alternative exhaust gas treatment devices may be used while remaining within the scope of this disclosure.

Engine 10 can include a controller 70. In some embodiments, the controller can include a processor 72, input/output ports 74, electronically programmable memory 76, random access memory 78, and/or other components. Controller 70 can be configured to receive various signals from sensors coupled to engine 10 via ports 74. Such received signals can include, but are not limited to: measurements of inducted mass air flow (MAF) from a mass air flow sensor 80; measurement of manifold pressure (MAP) from a manifold pressure sensor 82; pressure upstream of the supercharger (SIP), temperature upstream of the supercharger (ACT), and temperature downstream of the supercharger (MCT). Controller 70 can be used to control intake valve 32, fuel injector 60, booster 50, variable engagement mechanism 52, electronic throttle 40, and/or a variety of other drive system components. In some embodiments, two or more different controllers can be used to cooperatively control the various components. For the purpose of simplicity, engine operation is herein described with reference to a single controller, although two or more different controllers can be used.

Among other functions, controller 70 can manage electronic throttle control, supercharger engagement, and the interaction therebetween. As nonlimiting examples, and as described in more detail below, the controller can schedule a desired supercharger engagement state; determine a desired supercharger inlet pressure to be used for throttle angle scheduling; estimate air-flow into the cylinder; implement torque monitoring and/or provide continued system availability for degradation modes of the MAF sensor by measuring cylinder airflow redundant to and independent of the MAF sensor; and execute diagnostics and provide redundancy of the SIP sensor by inferring supercharger inlet pressure.

If the supercharger present in the system is mechanically or vacuum operated, then the desired operating state of the supercharger can be predetermined by the hardware. In the case that the amount of supercharger engagement can be controlled by the control system, then a scheduling of the supercharger engagement state can be made by the controller. Such scheduling can utilize feedback on parameters such as engine speed and load. However, since ETC is present in the system, and the amount of desired torque and airflow is known, a feed-forward scheduling of supercharger engagement can be made off of one or more of the following: 1) engine speed and/or desired load (absolute or percentage); 2) engine speed and/or desired torque (absolute or percentage); 3) predicted accessory device (e.g., front end accessory device or FEAD) losses at desired torque and/or predicted supercharger efficiency at desired torque for each engagement state; 4) rate of change of desired torque and/or estimated engagement time; and/or 5) various other combinations of feedback and/or feed-forward operating parameters.

In other words, supercharger control can be based on forecasted operating parameters of the engine. In some cases, forecasted operating parameters can include predicted operating parameters of the engine instead of or in addition to present or past operating parameters. In some cases, forecasted operating parameters can include operating parameters that are desired, and which changes in electronic throttle control, supercharger engagement, fuel injection, spark advance, accessory operating mode, or other aspects of a drive system can affect.

Because a desired torque and a desired engagement state can be predetermined, the electronic throttle control system can be used to improve continuity in torque as the supercharger engages and disengages, thus improving any transient dynamics associated with supercharger spool-up and/or spool-down. In some cases, it may be beneficial to increase or decrease airflow based on a predicted behavior of the engine instead of merely changing airflow in reaction to actually occurring engine behavior. As a nonlimiting example, the controller can predict how engaging a supercharger will increase torque, and may at least temporarily use the electronic throttle control to restrict air to the engine during at least part of the transition so as to limit a sudden increase in torque when the supercharger is engaged. Likewise, the controller may at least temporarily open the throttle during a disengagement transition of the supercharger so as to limit a sudden decrease in torque. In some embodiments, the throttle may be continuously modulated during supercharger transitions to account for torque output timing delays associated with engagement and disengagement of the supercharger. As used herein, "supercharger transition" can include time before and after the supercharger is engaged or disengaged in which the electronic controlled throttle is being opened and/or closed in anticipation of the engagement or disengagement.

In a torque based ETC system, a desired torque can be converted into a desired mass air-flow. The throttle angle to be commanded in order to achieve this desired mass air-flow is a function of the pressure drop across the throttle plate, and thus a prediction of that pressure drop can be made in order to pre-position the plate. This can be accomplished by first determining the desired torque/desired air-flow, using this information to schedule other components (e.g., supercharger, VCT, IMRC, spark, etc.), calculating a desired pressure drop across the throttle plate based on the desired air-flow and the desired states of these devices, and then scheduling the throttle plate angle based on the combination of desired airflow and desired throttle pressure drop.

In the case of a draw-through supercharger, the pressure drop across the throttle can be determined by barometric pressure and supercharger inlet pressure. A desired SIP can be calculated in order to successfully schedule the throttle. Descriptions of a nonlimiting collection of methods for determining the desired SIP are provided below.

The SIP sensor can be directly used for scheduling. While sacrificing the feed-forward benefit of a desired SIP value, the use of the SIP sensor directly provides an easy and accurate determination of throttle based on current operating conditions and device scheduling. Using such an embodiment, a backup mechanism for measuring SIP can be used in the event the primary SIP sensor function malfunctions. In some embodiments, one of the following described methods can be implemented in the event of a device degradation.

A recursive solution of the inlet pressure can be obtained based on pressure drop across the supercharger assembly (e.g., supercharger and bypass valve) subtracted from an empirically fit manifold pressure. This method allows for the calculation of an inferred manifold absolute pressure. This inference can be determined through a regression fit of MAP as a function of engine speed and cylinder air charge. A recursive loop can be used to solve for inlet pressure, starting with the last known throttle body vacuum (i.e., the control pressure on the supercharger bypass valve). The basic concept is the same, but can be represented in at least two different ways, which differ in chronometrics and calibration methodology.

One approach utilizes a table of supercharger delta pressures (SCDP), as a function of engine speed and MAP, for a bypass valve fully closed. This is then multiplied by a percent discount factor for bypass valve in an open or partially open state. This discount is determined using two functions: a function of percent bypass valve position based on throttle vacuum and a percent decrease in supercharger delta pressure when fully open versus fully closed as a function of MAP. A nonlimiting example of this approach can be represented in pseudo-code:

```
ETC_VAC = Last ETC_VAC
DES_MAP = normally calculated DES_MAP
For Count = 1 to Nloops
    SCDP = FN_SCDP_CL(ENGINE_SPEED, DES_MAP) *
        [1-(FN_SCBPV_ML(ETC_VAC)
        *FN_PCTSCDP_OP(DES_MAP) )]
    DES_SIP = DES_MAP - SCDP
    ETC_VAC = BP - DES_SIP
Next Count
```

Another approach utilizes a single lookup of two tables outside of the recursive loop: SCDP Closed Bypass and SCDP Open Bypass. These are both a function of engine speed and MAP. The recursive loop is then entered. A lookup is performed on a percent bypass valve position as a function of throttle vacuum. A total SCDP is calculated based on the bypass valve position and the lookups of SCDP open and closed. A nonlimiting example of this approach can be represented in pseudo-code:

```
ETC_VAC = Last ETC_VAC
DES_MAP = normally calculated DES_MAP
SCDP_C = FN_SCDP_CL(ENGINE_SPEED, DES_MAP)
SCDP_O = FN_SCDP_OP(ENGINE_SPEED, DES_MAP)
For Count = 1 to Nloops
    PCT_SCBPV_ACT = FN_SCBPV_ML(ETC_VAC)
    TOT_SCDP=(1-PCT_SCBPV_ACT)*SCDP_C+
        (PCT_SCBPV_ACT)*SCDP_O
    DES_SIP = DES_MAP - TOT_SCDP
    ETC_VAC = BP - DES_SIP
Next Count
```

A one-shot solution of equilibrium inlet pressure can be obtained based on an empirical fit of inlet pressure for bypass open and bypass closed conditions. A stable inlet pressure can be obtained in this manner without relying on recursion. This method does not depend on a calculation of inferred MAP. The basic concept behind this method is as follows: With the bypass valve in the fully closed position, a steady state inlet pressure can be achieved and can be measured at all operating points. The same can also be done with the bypass valve in the fully open position. A regression fit for inlet pressure can be found as a function of engine speed and air-mass (air charge) for both the bypass fully open and closed positions.

$$INF\_SIP = (PCT\_SCBPV\_OPEN)*SIP\_OPEN + (PCT\_SCBPV\_CLOSED)*SIP\_CLOSED$$

Furthermore, an equation for the inlet pressure at intermediate points based on air-mass and engine speed can be obtained: If X=Inf_sip, Yc=sip_closed, Yo=sip_open, Xa=SCBPV_TH_O, and Xb=SCBPV_TH_C $$X = \left(\frac{X - Xa}{Xb - Xa}\right) * Yc + \left(\frac{Xb - X}{Xb - Xa}\right) * Yo$$

$$X = \left(\frac{1}{Xb - Xa}\right) * [(X - Xa) * Yc + (Xb - X) * Yo]$$

$$X = \left(\frac{1}{Xb - Xa}\right) * [X * (Yc - Yo) + (Xb * Yo) - (Xa * Yc)]$$

$$X = \frac{(Xb * Yo) - (Xa * Yc)}{(Xb - Xa) - (Yc - Yo)}$$

$$INF\_SIP = \frac{(SCBPV\_TH\_C * SIP\_OPEN) - (SCBPV\_TH\_O * SIP\_CLOSED)}{(SCBPV\_TH\_C - SCBPV\_TH\_O) - (SIP\_CLOSED - SIP\_OPEN)}$$

A check of a stable open and stable closed position can be calculated. The valve is stable open if the resulting bypass open inlet pressure is less than the inlet pressure required to begin to close the bypass valve. Conversely, the valve is stable closed if the resulting bypass closed inlet pressure is greater than the inlet pressure where the valve just begins to open. An appropriate inlet pressure can be found using the following truth table.

| Stable Open | Stable Closed | Result |
|---|---|---|
| True | False | Bypass valve will be fully open S.S. |
| False | True | Bypass valve will be fully closed S.S. |
| False | False | Bypass valve partially open S.S. |
| True | True | Race condition/Hardware Problem |

A nonlimiting example of this approach can be represented in pseudo-code:

```
SCBPV_TH_O = BP - ETCVAC_OP
SCBPV_TH_C = BP - ETCVAC_CL
SIP_OP=FN_SIPSLOPE_OP(ENGINE_SPEED)*DESMAF+
    FN_SIPOFFSET_OP(ENGINE_SPEED)
SIP_CL=FN_SIPSLOPE_CL(ENGINE_SPEED)*DESMAF+
    FN_SIPOFFSET_CL(ENGINE_SPEED)
SCBPV_STAB_OP = (SIP_OP < SCBPV_TH_O)
SCBPV_STAB_CL = (SIP_CL > SCBPV_TH_C)
IF (SCBPV_STAB_OP && (!SCBPV_STAB_CL) )
    SIP = SIP_OP;
ELSE IF ( (!SCBPV_STAB_OP) && (!SCBPV_STAB_CL) )
    SIP = [ ( SCBPV_TH_C * SIP_OP) - (SCBPV_TH_O *
        SIP_CL) ] / [ (SCBPV_TH_C -
    SCBPV_TH_O) - (SIP_CL - SIP_OP) ]
ELSE IF ( (!SCBPV_STAB_OP) && SCBPV_STAB_CL)
    SIP = SIP_CL;
ELSE
    SIP = SIP_CL;
{This is a software protection, because it is improbable that this condition
could be achieved. SIP_CL can be used as a protection since this would
allow an assumption that the bypass is closed, which has more airflow,
which would give a P<D if the guess is wrong}
END
```

An estimate of in-cylinder air-flow can be calculated to properly fuel the engine and to predict the actual torque being produced by the engine. In-cylinder air-flow can be determined using a single manifold/single temperature method, a dual manifold/variable temperature method, and/or another suitable method.

Figure 2:
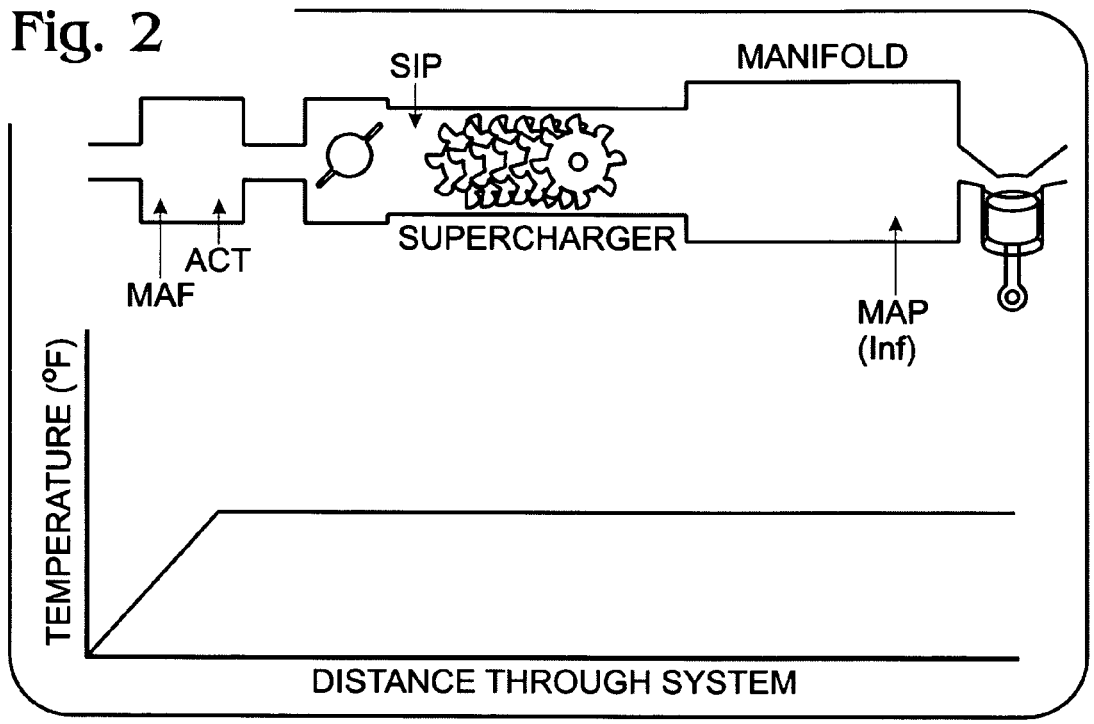
FIG. 2 schematically shows temperature throughout a portion of the drive system of FIG. 1 for a single manifold/single temperature model.

The single manifold/single temperature method is a lumped parameter model. This model is expected to work at least for systems in which the ratio of lower manifold volume to upper manifold volume is large and in which the intercooler contains a relatively small volume of air. This model effectively classifies the upper and lower manifold volumes as a single volume contained below the supercharger. As schematically shown in FIG. 2, the temperature across the system from air intake through to the cylinder is considered to remain at inlet air temperature (ACT). The volume prior to the supercharger is assumed to be zero, and thus flow into the throttle body is assumed to be equal to the flow out of the supercharger into the manifold. Traditional manifold filling is then performed on the throttle air-flow and the inlet air temperature. This method is simple and easy to implement efficiently.

The dual manifold/variable temperature model treats the filling dynamics in both the upper and lower manifolds independently, and with regards to actual flow across the supercharger between the two manifolds. The temperature in the upper intake can be determined from the upper intake temperature sensor (ACT) and is assumed constant within the upper intake. The temperature in the lower intake manifold varies as a function of linear distance and swept volume between three points within the system: supercharger outlet, intercooler outlet, and cylinder port. A simple model can be made for the amount of heat added to the air as it enters the supercharger at inlet air temperature from the upper manifold and then exits at the outlet. This function (engine speed and load based) allows for a calculation of air temperature exiting the supercharger.

Figure 3:
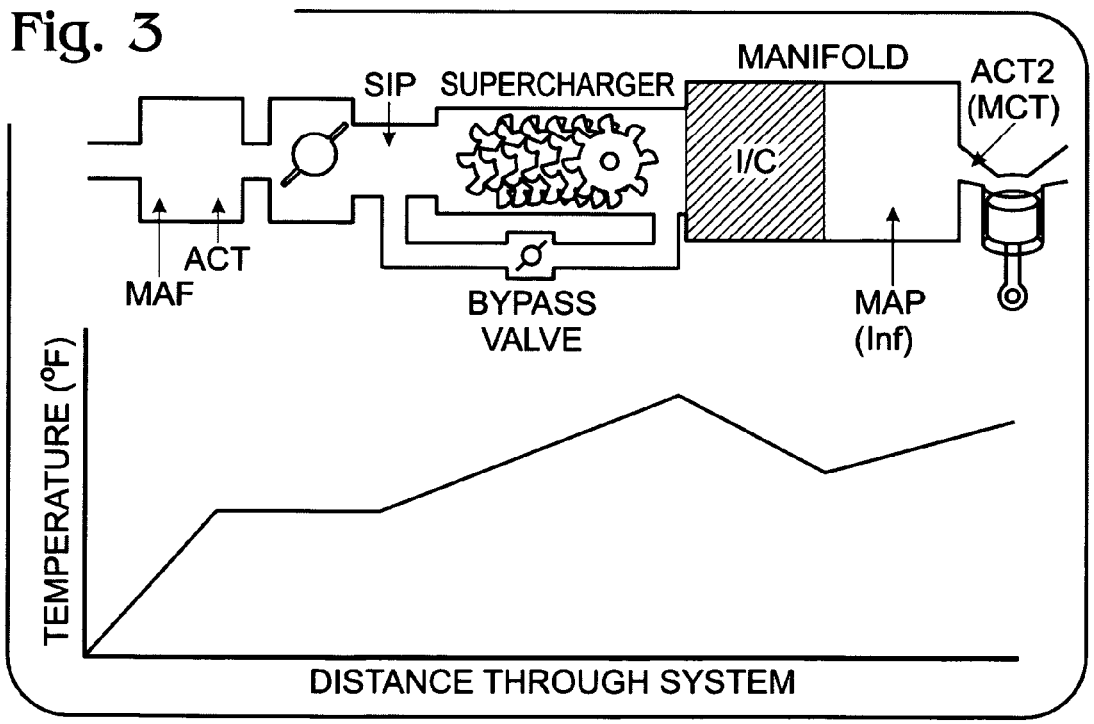
FIG. 3 schematically shows temperature throughout a portion of the drive system of FIG. 1 for a dual manifold/variable temperature model.

A second model of heat removed from the air in the inter-cooler can also be made. A function of percent blend between the two versus discrete volumes within the intercooler can be made. An interpolation then can be made over the remaining volume between the intercooler outlet and the cylinder where manifold charge temperature is sensed (MCT). Each discrete unit of volume can then be converted to a multiplier on air-density in the manifold as a ratio of unit volume temperature divided by MCT. These unit volume multipliers can then be multiplied to calculate a total correction factor to the temperature in the lower manifold, which is based on the total multiplier times MCT to arrive at an effective temperature of the lower manifold. The solution of air-flow can then be accomplished by starting with the throttle body air-flow, ACT, and SIP. Using the Ideal Gas Law, the net airflow through the supercharger can be found. Assuming a MAP sensor is present, then the same Ideal Gas Law calculation using flow through the supercharger, effective MCT, and MAP, can be used to find an accurate cylinder air-flow. FIG. 3 schematically shows a temperature model throughout the system for the dual manifold/variable temperature model.

A five step method can be used to infer intermediate pressures and airflows without using the SIP sensor, which ties the airflow estimate to two sensors and reduces independence, without a MAP sensor. The first step uses the current values of inferred SIP and inferred MAP to calculate a flow through the bypass valve of the supercharger, determining both magnitude and direction through the use of an orifice flow equation. The next step takes throttle body air-flow, ACT, and either inferred SIP or a filter constant for filling, to calculate the air-flow entering the supercharger. Inferred SIP can then be calculated normally, by using an air-flow which is the sum of the manifold-filled air from the throttle body and the flow through the bypass. The next step is then to calculate inferred MAP using the sum of the airflow into the supercharger and the flow through the bypass. Once inferred MAP is calculated, the final step takes the net airflow across the supercharger, effective MCT, and either inferred MAP or a filter constant for manifold filling to estimate the final cylinder air-flow.

An air-flow estimate of in-cylinder air-flow can be made without using the MAF sensor. This provides several benefits, including ensuring that an estimate of cylinder air-flow is provided for fueling the engine if the MAF sensor degrades, and providing a redundant torque estimate for torque monitoring. This may be accomplished using an orifice flow equation along with an indication throttle position and the SIP sensor output. Essentially the SIP sensor provides an indication of Barometric Pressure before the engine is running, and provides SIP after the engine is running, therefore the pressure drop across the throttle plate can be provided by the SIP sensor. Airflow through the throttle can then be found given SIP, BP, ACT and Throttle position. There are at least three methods that can then be used to convert this flow through the throttle into an in-cylinder air-flow. The first method uses the single manifold/single temperature model described above with reference to the MAF sensor to calculate cylinder air-flow. The second method uses the dual manifold/variable temperature model described above with reference to the MAF sensor to calculate cylinder air-flow. The third method uses throttle based airflow, ACT, and SIP with the Ideal Gas Law to find the net flow through the supercharger into the lower manifold. Manifold filling can then be performed on the supercharger flow, using either MCT or effective MCT.

In cases where the SIP sensor degrades, an inferred value can be used to facilitate uninterrupted operation of the vehicle. An inferred SIP value can additionally or alternatively be used for supercharger system diagnostics, such as to diagnose the SIP sensor. This concept can use the desired SIP function to calculate an inferred SIP value. Either the recursive or the one-shot equilibrium method, described above, can be used, although an actual engagement state of the bypass can be used instead of a predicted state. For example, with the equilibrium model, the actual mass airflow into the upper intake, from the MAF sensor, can be used instead of the desired mass airflow. In the case of the recursive model, an inferred MAP value can be used in place of the desired MAP present. With such minor modifications, the desired SIP functions can be used to calculate an inferred SIP.

The operating condition of a supercharger can be used to properly schedule throttle in a torque or airflow based electronic throttle controlled engine including a supercharger. Detecting supercharger degradation, such as over-boost and under-boost, can help avoid incorrect throttle scheduling. Various diagnostic procedures can be applied to different types of superchargers, for example to diagnose and/or treat degradation states of over-boost and under-boost. If a degradation state is detected, electronic control of the throttle can be used to adjust engine air delivery, thus providing a desired amount of air to the engine. In other words, electronic throttle control can be used to compensate for a supercharger that is over-boosting or under-boosting. This can be useful in embodiments in which the supercharger is configured with discrete on and off conditions. Furthermore, it may be particularly useful in embodiments in which the supercharger is configured for variable engagement, in which discrepancies in boosting output may not be as detectable as when a supercharger is off when it is expected to be on, or vice versa.

According to one diagnostic procedure, a relationship between one or more expected variables (i.e. supercharger inlet pressure, volumetric efficiency, etc.) and a measured, calculated, or inferred current condition based on one or more feedback measurements can be used to determine a percent supercharger engagement. In some embodiments, an expected variable at two different states, such as full boost and no boost, can be compared to the actual current variable. For example, the expected supercharger inlet pressure at full boost $SIP_{FB}$ and the expected inlet pressure at no boost $SIP_{NB}$ can be compared to a current supercharger inlet pressure $SIP_C$ (e.g., a measured, calculated, or inferred supercharger inlet pressure). Assuming that the supercharger engagement percentage is linear with inlet pressure, the following relationship can be used to determine the percentage of supercharger engagement $SC_\%$:

$$SC_\% = \frac{SIP_C - SIP_{NB}}{SIP_{FB} - SIP_{NB}}$$

The percentage of supercharger engagement $SC_\%$, determined as described above, can then be compared to the expected supercharger engagement. Such a comparison can serve as an effective test for determining if the supercharger is engaged as expected, or if the supercharger is in a degradation state in which it is over-boosting or under-boosting. If it is determined that the supercharger is over-boosting or under-boosting, the engagement state of the supercharger can be changed, the air throttling can be changed, or other adjustments can be made to achieve desired engine operation.

Figure 4:
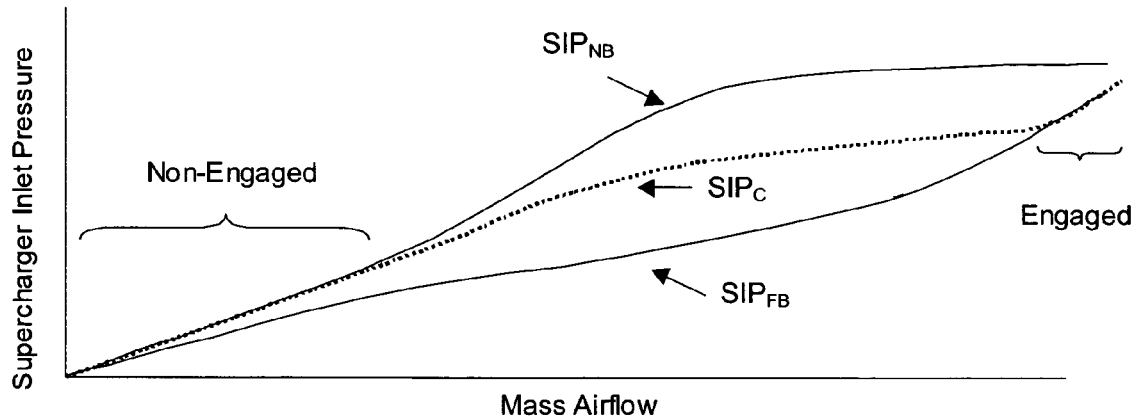
FIG. 4 schematically shows a visual representation of a method of diagnosing supercharger failure by determining a percentage supercharger engagement.

FIG. 4 shows a plot that compares mass airflow and supercharger inlet pressure in one expected set of operating conditions. In this example, at low mass airflow and low supercharger inlet pressure, the current supercharger inlet pressure is substantially the same as the expected supercharger inlet pressure at no boost. Accordingly, the percentage of supercharger engagement could be calculated to be about 0%. Conversely, at high mass airflow and high supercharger inlet pressure, the current supercharger inlet pressure is substantially the same as the expected supercharger inlet pressure at full boost. Accordingly, the percentage of supercharger engagement could be calculated to be about 100%. Such calculations can be used to determine that the supercharger is engaged or nonengaged, as expected.

The above described diagnostic test is a nonlimiting example of how an expected variable can be compared to an actually measured, calculated, or inferred variable to determine if the supercharger is functioning as commanded. Other variables besides supercharger inlet pressure can be used in some tests, and nonlinear relationships can be used in some tests.

According to another diagnostic procedure, supercharger degradation can be detected by monitoring an airflow/pressure delta when the expected/commanded state of supercharger engagement changes (intrusively or non-intrusively).

An engine operating parameter (such as volumetric efficiency, boost, etc.) can be monitored to detect if a significant change is detected when the supercharger is expected to cycle from an engaged state to an unengaged state, or vice versa. In the un-intrusive mode, the parameter value is monitored and recorded at one known set of operating conditions with the mode of operation either engaged or un-engaged. When a second region of operating conditions is reached, where the state of engagement has switched, the parameter value is again monitored and recorded. When confidence in the samples in these two operating regions is great enough, a delta can be computed between the two regions, and if the delta is not significant enough, then it can be inferred that a degradation is present and that the supercharger did not properly switch engagement states. Further analysis can then be made based on the expected value of the parameter under investigation as compared to the expected value for each engagement state in order to determine which degradation type is present. For the intrusive version of this test, the supercharger can be engaged and disengaged at will whenever the proper operating conditions are reached. With the use of electronic throttle control, any disturbance created by the intrusive test could be substantially mitigated by throttle modulation.

Figure 5:
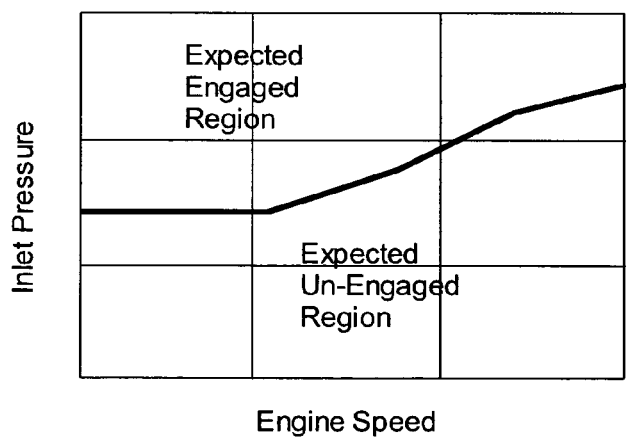
FIG. 5 schematically shows a visual representation of a method of diagnosing supercharger failure by detecting an airflow/pressure delta when a supercharger is commanded to change engagement states.

FIG. 5 shows a visual representation of the above described concept when volumetric pumping efficiency is used as an indicator. As such, the volumetric pumping efficiency can be analyzed in each of the cells in FIG. 5. These values can then be compared as operating conditions transition across the expected engagement line. In other embodiments, indicators other than volumetric pumping efficiency can be used.

According to another diagnostic procedure, direct detection of over-boost or under-boost conditions can be used to diagnose supercharger operation. An expected state of operation for the supercharger engagement can be determined by a queried command state for electronically controlled superchargers or by vacuum measurement for vacuum operated superchargers. A set of control variables (i.e. engine speed, airflow, etc.) that influence pressure drop across the supercharger can be used to determine an expected boost amount at the current engine operating conditions for each state of the supercharger (i.e. engaged/non-engaged).

Figure 6A:
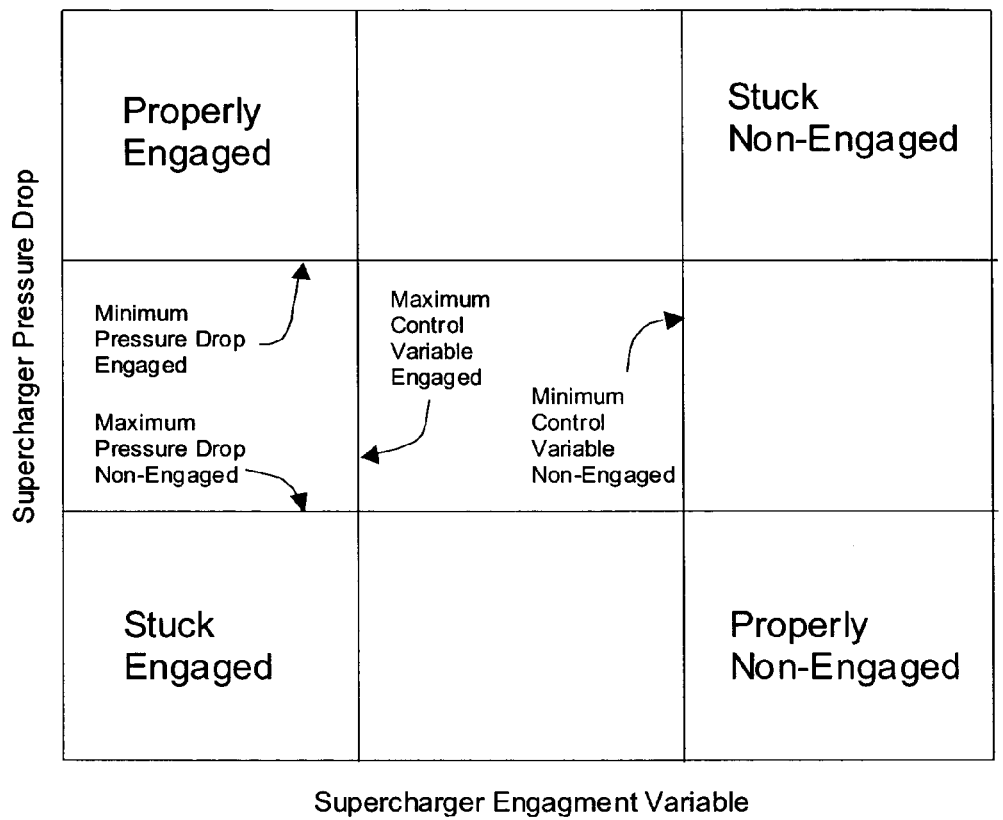
FIGS. 6a, 6b, and 6c schematically show a visual representation of a method of diagnosing supercharger failure by directly detecting over-boost or under-boost conditions.
Figure 6B:
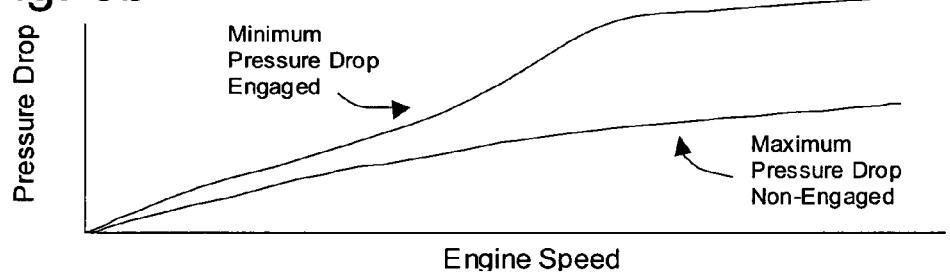
Figure 6C:
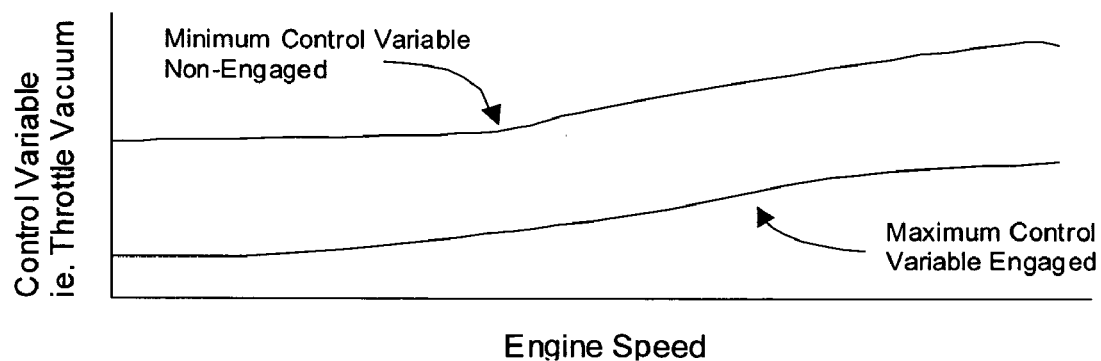

The actual condition of pressure drop across the supercharger can be found by inferred and/or measured pressures upstream and downstream of the entire supercharger subsystem. As shown in FIG. 6a, a series of regions based on the expected state of engagement and current supercharger pressure drop can be made from an analysis of two or more different diagnostic factors. FIGS. 6b and 6c show a visual representation of this diagnostic procedure. In particular, an operating parameter (e.g., engine speed) is compared to pressure drop in FIG. 6b and, in FIG. 6c, to a control/engagement variable (e.g., vacuum for vacuum operated superchargers or scheduling parameter(s) for electronically controlled superchargers). Actual and/or inferred measurements of pressure drop and control variable can be compared to the plots of FIGS. 6b and 6c, with the results being assigned to one of the delineated regions of FIG. 6a, as explained below.

In the region where the supercharger is expected to be engaged and the actual pressure drop is equal to or smaller than the largest expected pressure drop in the un-engaged state, then the system can be determined to be stuck non-engaged. Vice-versa, if the expected state is non-engaged and the actual pressure drop is equal to or larger than the smallest pressure drop expected in the engaged state, then the supercharger can be determined to be stuck engaged. Two other regions denote proper operation where engagement is expected and pressure drop is larger than the minimum for engaged or where non-engagement is expected and the pressure drop is less than the maximum for nonengaged. In all other states, uncertainty may be too high to conclusively diagnose the condition of the supercharger operation.

What is claimed is:

1. A drive system, comprising:
an engine configured to convert chemical energy into mechanical energy;
an electronically-controlled air throttle configured to regulate air delivery to the engine;
a supercharger configured to selectively increase pressure of the air delivered to the engine; and
a supercharger diagnostic system configured to diagnose supercharger over-boosting or under-boosting, wherein the supercharger diagnostic system includes a processor and a memory, the memory including instructions that when executed, diagnose supercharger over-boosting or under-boosting.

2. The drive system of claim 1, wherein the supercharger diagnostic system is configured to monitor a supercharger pressure delta when a supercharger engagement state is commanded to change.

3. The drive system of claim 1, wherein the supercharger diagnostic system is configured to determine an expected supercharger engagement state at least in part by measuring vacuum.

4. The drive system of claim 1, wherein the supercharger diagnostic system is configured to query supercharger electronic control to determine an expected supercharger engagement state.

5. The drive system of claim 1, wherein the supercharger diagnostic system is configured to determine a percentage of supercharger engagement.

6. The drive system of claim 5, wherein a comparison of a current supercharger inlet pressure to a supercharger inlet pressure expected in a supercharger engaged operating mode and a supercharger inlet pressure expected in a non-engaged supercharger operating mode is used to calculate the percentage of supercharger engagement.

7. A drive system, comprising:
an engine configured to convert chemical energy into mechanical energy;
an electronically-controlled air throttle configured to regulate air delivery to the engine;
a supercharger configured to variably increase pressure of the air delivered to the engine;
a supercharger diagnostic system configured to assess a level of variable supercharger engagement; and
a controller configured to adjust the electronically-controlled air throttle based at least in part on the assessed level of variable supercharger engagement;
wherein the electronically-controlled air throttle and the controller are configured to cooperatively maintain substantial continuity in torque as engagement of the supercharger changes.

8. The drive system of claim 7, wherein the supercharger is configured for 100% engagement, 0% engagement, and at least one level of engagement intermediate 100% engagement and 0% engagement.

9. A method of coordinating electronic throttle control and supercharger operation in a drive system including a supercharger and electronic throttle control, comprising:
regulating engine air delivery with an electronically controlled throttle according to at least an expected engagement state of the supercharger;
determining if the supercharger is in the expected engagement state, wherein determining if the supercharger is in the expected engagement state includes measuring vacuum;
adjusting electronic throttle control if the supercharger is not in the expected engagement state.

10. The method of claim 9, wherein determining if the supercharger is in the expected engagement state includes determining a percentage of supercharger engagement.

11. The method of claim 9, wherein determining if the supercharger is in the expected engagement state includes monitoring a supercharger pressure delta when a supercharger engagement state is commanded to change.

12. The method of claim 9, wherein determining if the supercharger is in the expected engagement state includes querying supercharger electronic control to determine an expected supercharger engagement state.

13. A method of diagnosing a supercharger failure mode, comprising:
determining an actual value of a first variable for a current operating condition of an engine;
comparing the actual value to an expected value of the first variable; and
deciding if the supercharger is in an expected operating mode based on the comparison;
wherein the first variable includes supercharger inlet pressure, and wherein the current supercharger inlet pressure is compared to a supercharger inlet pressure expected in a supercharger engaged operating mode and a supercharger inlet pressure expected in a non-engaged supercharger operating mode, and wherein a comparison of the current supercharger inlet pressure to the supercharger inlet pressure expected in a supercharger engaged operating mode and the supercharger inlet pressure expected in a non-engaged supercharger operating mode is used to calculate a percentage of supercharger engagement.

14. The method of claim 13, wherein the actual value is compared to the expected value in an engaged operating mode of the supercharger and a non-engaged operating mode of the supercharger.

15. A method of coordinating electronic throttle control and supercharger operation in a drive system including a supercharger and electronic throttle control, comprising:
regulating engine air delivery with an electronically controlled throttle according to at least an expected engagement state of the supercharger;
determining if the supercharger is in the expected engagement state, wherein determining if the supercharger is in the expected engagement state includes querying supercharger electronic control to determine an expected supercharger engagement state;
adjusting electronic throttle control if the supercharger is not in the expected engagement state.

* * * * *